US007076315B1

(12) United States Patent
Watts

(10) Patent No.: US 7,076,315 B1
(45) Date of Patent: Jul. 11, 2006

(54) EFFICIENT COMPUTATION OF LOG-FREQUENCY-SCALE DIGITAL FILTER CASCADE

(75) Inventor: Lloyd Watts, Mountain View, CA (US)

(73) Assignee: Audience, Inc., Mountain View, CA (US)

( * ) Notice: Subject to any disclaimer, the term of this patent is extended or adjusted under 35 U.S.C. 154(b) by 0 days.

(21) Appl. No.: 09/534,682

(22) Filed: Mar. 24, 2000

(51) Int. Cl.
*G06F 17/00* (2006.01)
*H04R 25/00* (2006.01)

(52) U.S. Cl. ........................ 700/94; 381/312; 381/320; 381/316

(58) Field of Classification Search ................ 381/312, 381/61, 320, 316; 704/200.1; 700/94; 607/56
See application file for complete search history.

(56) References Cited

U.S. PATENT DOCUMENTS

| | | | | |
|---|---|---|---|---|
| 3,978,287 | A | 8/1976 | Fletcher et al. | |
| 4,433,604 | A | 2/1984 | Ott | |
| 4,516,259 | A | 5/1985 | Yato et al. | |
| 4,536,844 | A * | 8/1985 | Lyon | 607/56 |
| 4,812,996 | A | 3/1989 | Stubbs | |
| 4,920,508 | A * | 4/1990 | Yassaie et al. | 708/603 |
| 5,027,410 | A * | 6/1991 | Williamson et al. | 381/320 |
| 5,054,085 | A | 10/1991 | Meisel et al. | |
| 5,099,738 | A | 3/1992 | Hotz | |
| 5,119,711 | A | 6/1992 | Bell et al. | |
| 5,142,961 | A | 9/1992 | Paroutaud | |
| 5,187,776 | A | 2/1993 | Yanker | |
| 5,381,512 | A | 1/1995 | Holton et al. | |
| 5,402,493 | A * | 3/1995 | Goldstein | 381/61 |
| 5,473,759 | A | 12/1995 | Slaney et al. | 395/2.75 |
| 5,502,663 | A * | 3/1996 | Lyon | 708/300 |
| 5,675,778 | A | 10/1997 | Jones | |
| 5,732,189 | A * | 3/1998 | Johnston et al. | 704/230 |
| 5,792,971 | A | 8/1998 | Timis et al. | |
| 5,983,139 | A * | 11/1999 | Zierhofer | 607/56 |
| 6,137,349 | A * | 10/2000 | Menkhoff et al. | 327/552 |
| 6,140,809 | A | 10/2000 | Doi | |
| 6,513,004 | B1 | 1/2003 | Rigazio et al. | |
| 2002/0147595 | A1 | 10/2002 | Baumgarte | |

OTHER PUBLICATIONS

Richard Kessel, Lyon's Cochlear Model, 1988, Apple Technical Report #13.*

Slaney. Malcolm. Lyon's Cochlear Model, Advanced Technology Group, 1979, whole document, in particular pp. 7 and 73.*

Slaney, Malcolm. Lyon's Cochlear Model, Advanced Techonlogy Group, 1979, whole document, in particular pp. 7 and 73.*

(Continued)

*Primary Examiner*—Vivian Chin
*Assistant Examiner*—Devona E. Faulk
(74) *Attorney, Agent, or Firm*—Carr & Ferrell LLP

(57) ABSTRACT

A system for processing audio signals comprises a sequence of digital filters each configured to process a selected frequency using a set of coefficients. A filter configured to process a certain frequency shares its coefficients with another filter that processes a frequency that is lower than the first frequency by at least one frequency interval, such as an octave. The first filter samples at a certain sampling rate, and the second filter's sampling rate is determined by multiplying the first sampling rate by the ratio of the second frequency to the first frequency. The filters are evenly grouped into frequency intervals, such as octaves. Filters in an octave are sampled at a sampling frequency that is at least twice as high as the highest frequency processed in that octave.

22 Claims, 3 Drawing Sheets

OTHER PUBLICATIONS

Slaney, Malcolm, "Lyon's Cochlear Model", 1988, Apple Technical Report #13, AppleComputer, Inc.

James M. Kates, A Time-Domain Digital Cochlear Model, Dec. 1991, IEEE Transactions on Signal Processing, vol. 39, No. 12.

Jeong et al., "Implementation of a New Algorithm Using the STFT with Variable Frequency.Resolution for the Time-Frequency Auditory Model," Journal of Audio Eng. Soc., vol. 47, No. 4, Apr. 1991, pp. 240-251.

Syntrillium Software Corporation, "Cool Edit User's Manual," 1996, pp. 1-74.

Watts, "Robust Hearing Systems for Intelligent Machines," Applied Neurosystems Corporation, 2001, pp. 1-5.

Lippmann, "Speech Recognition by Machines and Humans," Speech Communication 22, 1997, pp. 1-15.

Hermansky, "Should Recognizers Have Ears?" in the Proc. ESCA Tutorial and Research Workshop on Robust Speech Recognition for Unknown Communication Channels, France, 1997, pp. 1-10.

U.S. Appl. No. 10/177,049, filed Jun. 21, 2002, Lloyd Watts, "Robust Hearing Systems for Intelligent Machines".

U.S. Appl. No. 09/993,442, filed Nov. 13, 2001, Lloyd Watts, "Editing of Audio Signals".

U.S. Appl. No. 10/074,991, filed Feb. 13, 2002, Lloyd Watts, "Filter Set for Frequency Analysis".

* cited by examiner

EFFICIENT COMPUTATION OF LOG-FREQUENCY-SCALE DIGITAL FILTER CASCADE

FIELD OF THE INVENTION

This invention relates generally to a method, article of manufacture, and apparatus for computing the response of a cascade of digital filters in an efficient manner that provides for high resolution while reducing computational expense and storage requirements. More particularly, this invention relates to modeling a cochlea for real-time processing of acoustic signals using an improved digital filter bank cascade.

BACKGROUND

Much effort has been devoted to modeling hearing, for applications such as automatic speech recognition, noise cancellation, hearing aids, and music. A popular approach is to model the cochlea, a coiled snail-shaped structure that is part of the inner ear as shown in FIG. 1. The cochlea is a spiraling, fluid-filled tunnel embedded in the temporal bone, and converts acoustic signals into electrical signals transmitted to the brain. Sound pressure waves strike the eardrum, causing it to move inward and moving the three small bones of the middle ear, which are the hammer, anvil, and stirrup. The movement of the bones initiates pressure waves in the cochlear fluid. These pressure waves propagate along the cochlear partition, which, as shown in FIG. 2, consists of the basilar membrane BM, tectorial membrane TM, and organ of Corti OC. The organ of Corti OC is a collection of cells, including the sensory hair cells, that sit on the basilar membrane BM. The bases (bottoms) of these hair cells are connected to nerve fibers NF from the auditory nerve AN, and the apexes (tops) of the hair cells have hair bundles HB. There are two types of hair cells in the cochlea: inner hair cells IHC and outer hair cells OHC.

The human cochlea is believed to contain approximately 4,000 inner hair cells IHC and 12,000 outer hair cells OHC, with four cells radially abreast and spaced every 10 microns along the length of the basilar membrane BM. The tectorial membrane TM lies on top of the surface of the organ of Corti OC. A thin fluid space of about 4 to 6 microns lies between these two surfaces, which shear as the basilar membrane BM moves up and down. The hair cells are primarily transducers that convert displacement of the hair bundle HB (due to shearing between the tectorial membrane TM and the surface of the organ of Corti) into a change in the receptor current flowing through the cell, which is transmitted to the auditory nerve AN and processed by the brain.

Each point on the basilar membrane BM is tuned to a different frequency, with a spatial gradient of about 0.2 octaves/mm for a human, and about 0.32 octaves/mm for a cat. Roughly speaking, the cochlea acts like a bank of filters. The filtering allows the separation of various frequency components of the signal with a good signal-to-noise ratio. The range of audible frequencies is about 20 Hz to 16 kHz in the human cochlea and about 100 Hz to 40 kHz in the cat cochlea.

Modeling the function of the cochlea has been an active area of research for many years. For example, U.S. Pat. No. 4,771,196, titled "Electronically variable active analog delay line" and issued to Mead and Lyon on Sep. 13, 1988, describes an analog filter bank cascade for signal processing. This patent, the disclosure of which is hereby incorporated by reference, illustrates an electronically variable active analog delay line that incorporates cascaded differential transconductance amplifiers with integrating capacitors and negative feedback from the output to the input of each noninverting amplifier. "Lyon's Cochlear Model", written in 1988 by Malcolm Slaney as Apple Technical Report #13, describes a digital filter bank cascade developed by Lyon as a model of the cochlea. Further details of the Lyon model may be seen by reference to the technical report, the disclosure of which is hereby incorporated by reference.

This model uses a cascade of second-order filters, each of which requires a number of computations every time the signal is sampled. Each filter has a set of coefficients associated with it, and must also store some previous computations. If the sampling rate is increased, or the number of filters is increased in order to increase resolution, the number of computations rises proportionally. Thus, the desire for better resolution and sampling of the acoustic signal is balanced against the computations required and the storage needed for each filter. A more efficient approach, such as the approach of the present invention, would reduce the computation required for the cascade and allow for a higher quality representation of the signal.

This problem is not limited to digitized signals represented by discrete amplitude levels, nor is it limited to acoustic signals. Rather, it applies to any sampled signal (represented by discrete time values). Although the disclosure herein describes the problem and the invention in the context of audio signal processing, one skilled in the art will recognize that the invention may be applied to any signal processing using sampling, including electrical waveform sampling and video signal processing.

SUMMARY OF THE INVENTION

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

Briefly, therefore, this invention provides for a method, article of manufacture, and apparatus for real-time processing of signals. In an embodiment of the invention, a system for processing audio signals comprises a sequence of digital filters each configured to process a selected frequency using a set of coefficients. A filter configured to process a certain frequency shares its coefficients with another filter that processes a frequency that is lower than the first frequency by at least one frequency interval, such as an octave. The first filter samples at a certain sampling rate, and the second filter's sampling rate is determined by multiplying the first sampling rate by the ratio of the second frequency to the first frequency. The filters are evenly grouped into frequency intervals, such as octaves. Filters in an octave are sampled at a sampling frequency that is at least twice as high as the highest frequency processed in that octave.

The advantages and further details of the present invention will become apparent to one skilled in the art from the following detailed description when taken in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DESCRIPTION OF THE INVENTION

Overview

Figure 1:
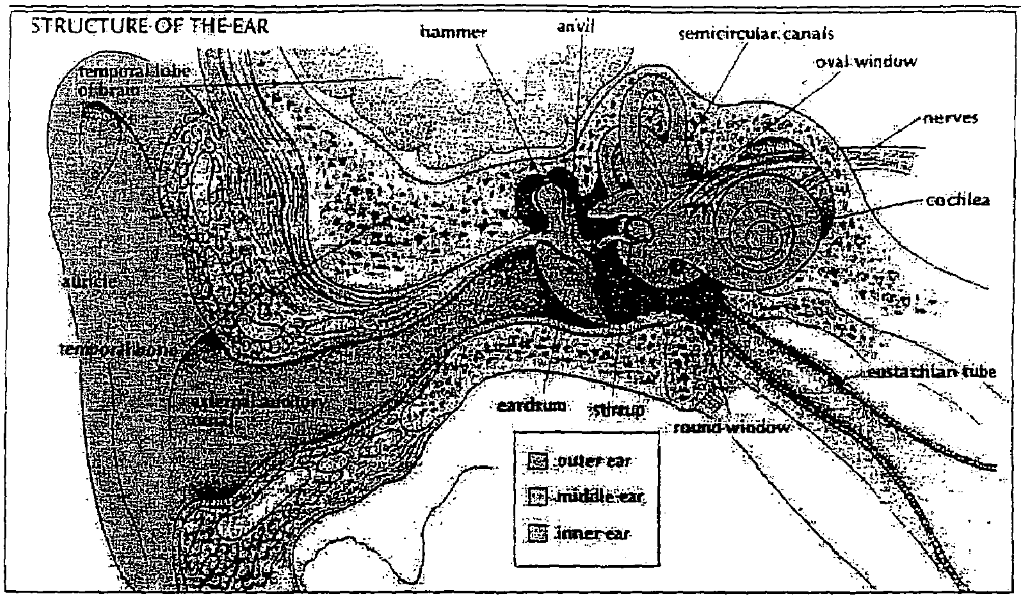
FIG. 1 is a sectional view of the inner and outer ear of a human ear.
Figure 2:
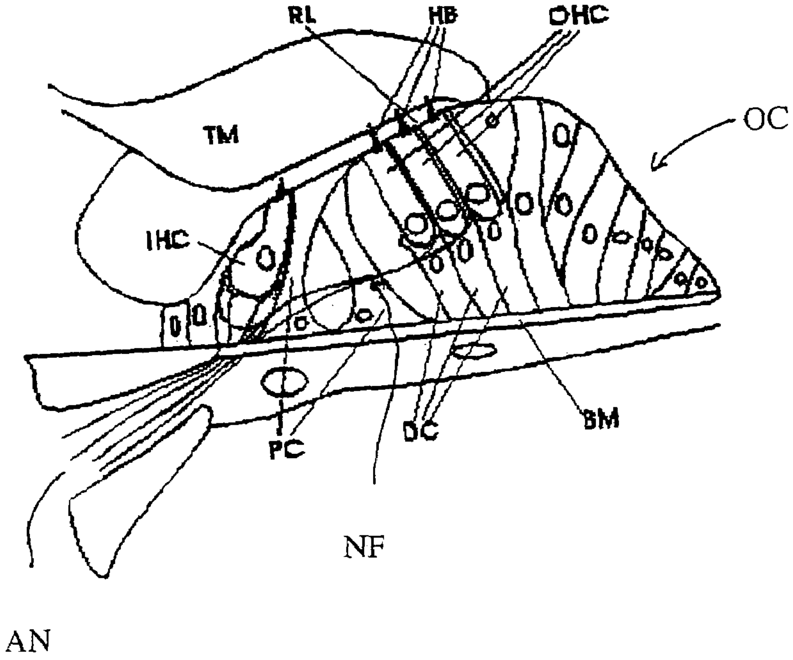
FIG. 2 is a sectional view of the inner ear of a human ear.

A signal processing system in accordance with the invention comprises a computer configured with a cascade of digital filters arranged sequentially on a logarithmic frequency scale, through which a signal is passed. The filters are configured to process certain frequencies and are programmed with filter coefficients appropriate to the desired filter behaviors and frequencies processed. Each successive filter in the sequence is configured to process a lower frequency than the one before it. Each filter also has a tap associated with it for extracting the filter output, and the number of filters and taps is determined by the desired resolution and frequency range. The filters are grouped into octaves, and within an octave group, a sampling rate is used that meets the Nyquist sampling criterion for the highest frequency filter in the octave. The filters in the highest octave use the same filter coefficients as filters in the lower octaves, with each successively lower octave group using a successively lower sampling rate to produce the lower frequency filters. Since the filters in each octave group remove the highest frequencies in the signal, the sampling rate can be reduced between octaves without violating the Nyquist sampling criterion.

In another embodiment of the invention, a filter can be used to process a certain frequency at a certain sampling rate and reused to process other frequencies that are one, two, or more octaves higher or lower, with a corresponding adjustment to the sampling frequency based on the highest frequency in the octave of target frequency. Another filter can be used to process another frequency in the same octave, and be reused to process other frequencies that are one, two, or more octaves higher or lower. In this manner, an array of filters covering a single octave can be used to process signals spanning multiple octaves.

In a further embodiment of the invention, the efficient digital filter bank cascade can be used as a model of a cochlea to process acoustic signals with improved accuracy and resolution, and more efficient use of computational and storage resources.

The response of this cascade of digital filters is thus computed in an efficient manner that provides for high resolution while reducing computational expense and storage requirements.

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications, and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Detailed Description

Figure 3:
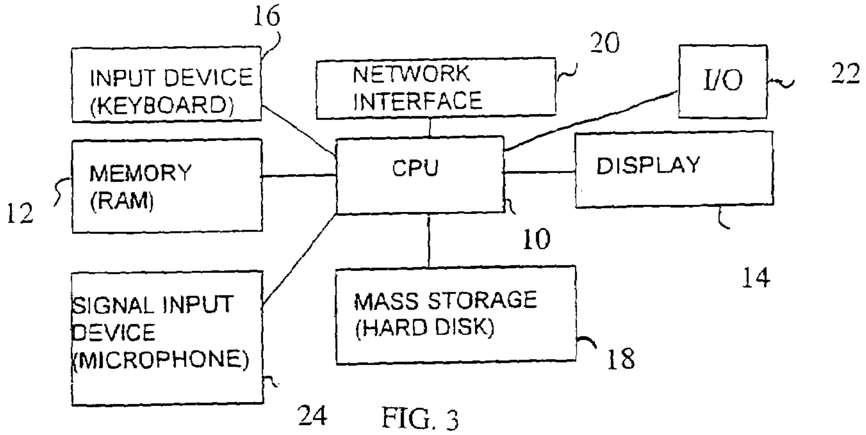
FIG. 3 is a schematic of a signal processing system in accordance with the invention.

In accordance with the invention, a signal processing system comprises a computer configured to analyze signals, such as acoustic or audio signals. In an embodiment of the invention, the signal processing system is in the form of a software program being executed on a general-purpose computer such as an Intel Pentium-based PC running a Windows or Linux operating system, or a workstation running Unix. Other means of implementing the signal processing system may be used, such as a special-purpose hardwired system with instructions burned into a chip such as an application specific integrated circuit (ASIC) or field-programmable gate array (FPGA). As is usual in the industry, the computer (CPU) 10 may have memory 12, a display 14, a keyboard 16, a mass storage device 18, a network interface 20, and other input or output devices 22, shown in FIG. 3. Also shown in FIG. 3 is a signal input device 24 in the form of a microphone, though other types of signal input devices may be used. In accordance with common practice, the memory 12 and the mass storage device 18 can be used to store program instructions and data. The computer may further have more than one central processing unit, such as a multiprocessor Pentium-based system or Sun SPARCstation.

It will be readily apparent to one skilled in the art that more than one computer may be used, such as by using multiple computers in a parallel or load-sharing arrangement or distributing tasks across multiple computer such that, as a whole, they perform the functions of the signal processing system; i.e. they take the place of a single computer. It is intended that the disclosure cover all such configurations as if fully set forth herein.

A signal processing system in accordance with the invention comprises a computer configured with program describing a cascade of digital filters arranged sequentially on a logarithmic frequency scale, through which a signal is passed. The filters are configured to process certain frequencies and are programmed with filter coefficients appropriate to the desired filter behaviors and frequencies processed. Each successive filter in the sequence is configured to process a lower frequency than the one before it. Each filter also has a tap associated with it, and the number of filters and taps is determined by the desired resolution and frequency range. A filter is used to process a signal of a certain frequency at a certain sampling rate, and shares its filter coefficients with filters configured to process signals of frequencies that are one, two, or more octaves lower. The filter also attenuates its target frequency and passes the signal on to the next filter in the sequence. For each successive filter in the sequence, the sampling rate may be reduced in proportion to the reduction in its target frequency. For convenience, the filters may be grouped into octaves, and each filter in an octave will be sampled at a rate that meets the Nyquist sampling criterion for the highest frequency filter in the octave. Lower octaves will be sampled at successively lower rates.

In another embodiment of the invention, a filter can be used to process a certain frequency at a certain sampling rate and reused to process other frequencies that are one, two, or more octaves higher or lower, with a corresponding adjustment to the sampling frequency based on the target frequency, in accordance with the Nyquist sampling criterion. Another filter can be used to process another frequency in the same octave, and be reused to process other frequencies that are one, two, or more octaves higher or lower. In this manner, an array of filters covering a single octave can be used to process signals spanning multiple octaves. Similarly to the above embodiment, the sampling rate can be reduced as the octave of frequencies being sampled is lowered.

Figure 4:
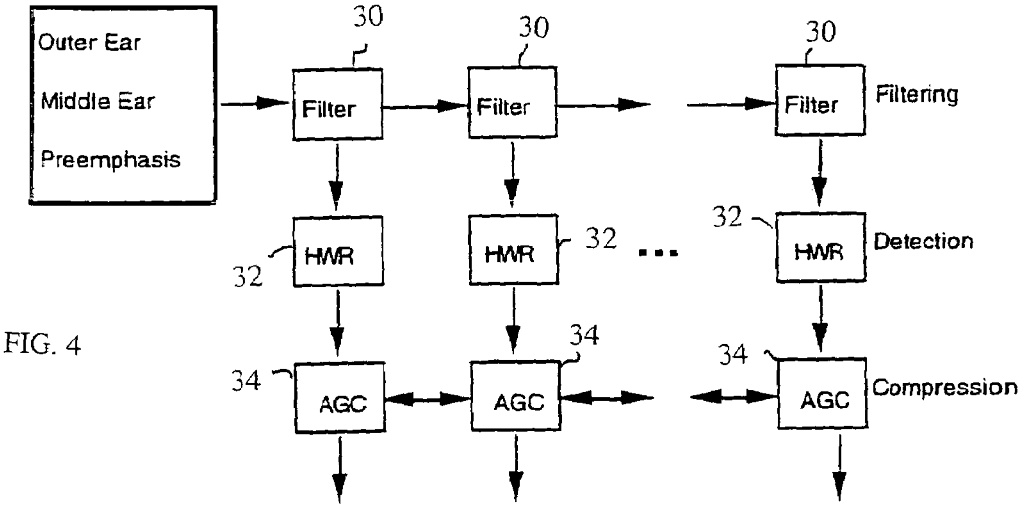
FIG. 4 depicts the structure of the cochlear model in a serial filter bank cascade configuration in accordance with the invention.

The invention will be illustrated by its use in audio signal processing, utilizing a model of the cochlea. This model describes the propagation of sound in the inner ear and the conversion of acoustic signals into neural signals. It combines a series of filters that model the traveling pressure waves with half-wave rectifiers to detect the energy in the signal and several stages of automatic gain control, as shown in FIG. 4. Sound pressure waves cause displacement of the hair cells and generation of neural signals as described above. This is modeled by the filters, which, like the hair cells, are tuned to specific frequencies. The basilar membrane is attuned to high frequency sounds near the base of the cochlea, where the sound enters, and senses progressively lower and lower frequencies as the sound pressure wave travels through the cochlea. The filters in the model are arranged similarly, with each filter attuned to a higher frequency than succeeding filters, so that the signal is gradually low-pass filtered.

Figure 5:
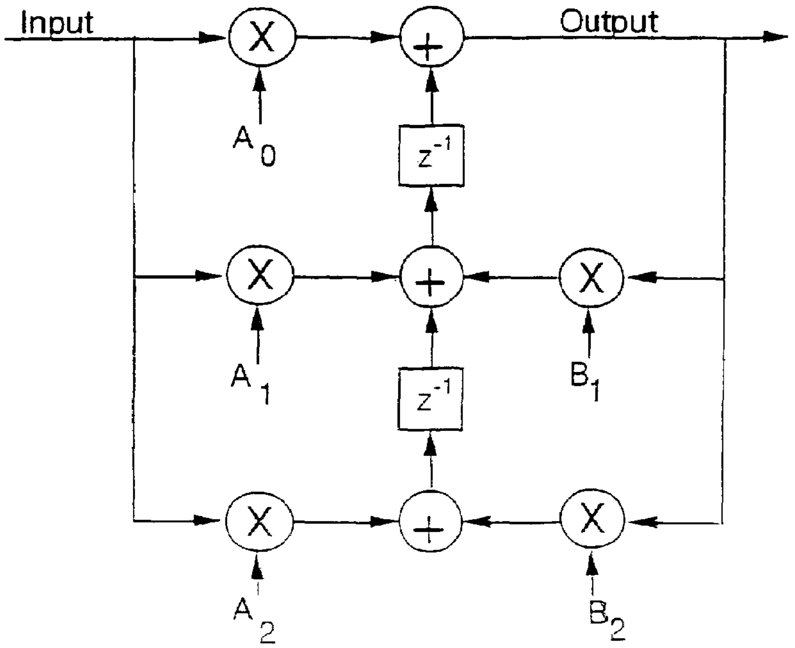
FIG. 5 is a signal flow graph of a filter equation in accordance with the invention.

In this model, the audio signal acquired from the signal input device 24 undergoes some preprocessing, and is then passed through a cascade of sequentially arranged filters 30 to model the propagation of the sound pressure waves through the cochlea, from left to right in the diagram of FIG. 4. Each filter 30 in the cascade has an output that feeds into the input of the next filter 30 in the cascade (if one is present), and a tap that allows data to be extracted from the filter 30, which in this embodiment is the data provided to the filter output. The tap has several stages of processing associated with it, such as a half-wave rectifier 32<and automatic gain control 34. Each filter is attuned to a particular frequency, and has a set of coefficients ($a_0$, $a_1$, $a_2$, $b_1$, $b_2$) associated with it. The output of each filter is calculated according to the following function:

$$y_n=a_0x_n+a_1x^{n-1}+a_2x_{n-2}-b_1y_{n-1}-b_2y_{n-2} \quad \text{Equation 1}$$

where the filter output $y_n$ is a function of the input data $x_n$ at time n, previous inputs $x_{n-1}$ and $x_{n-2}$, and previous outputs $y_{n-1}$ and $y_{n-2}$. This formula is illustrated by the signal flow graph in FIG. 5. The output of the filter $y_n$ is passed to the input $x_n$ of the next filter in the cascade.

The filter response H(z) is given by the following:

$$H(z)=\frac{a_0+a_1z^{-1}+a_2z^{-2}}{1+b_1z^{-1}+b_2z^{-2}}. \quad \text{Equation 2}$$

and $$z=e^{i*(\omega/\omega_s)},\ \omega=2\pi f,\ \omega_s=2\pi f_s$$

where $f_s$ is the sampling frequency.

Substitution of the above into the transfer function of Equation 2 produces a filter response H(f), which is a function of the filter coefficients $a_0$, $a_1$, $a_2$, $b_1$, $b_2$ and the sampling rate $f_s$.

In this audio signal processing embodiment, the frequency range typically used is 20 Hz to 20 kHz, since that is roughly the range of human hearing. With about 4,000 inner hair cells, a human has the equivalent of 4,000 taps spread over ten octaves, or about 400 taps per octave.

The Nyquist Theorem states that when an analog waveform is digitized, only the frequencies in the waveform below half the sampling frequency will be recorded. In order to accurately represent the original waveform, sufficient samples must be recorded to capture the peaks and troughs of the original waveform. If a waveform is sampled at less than its Nyquist frequency (which is twice the frequency of the waveform), the reconstructed waveform will represent low frequencies not present in the original signal. This phenomenon is called "aliasing", and the high frequencies are said to be "under an alias".

Thus, since the highest frequency is 20 kHz, the Nyquist frequency is 40 kHz. The standard sampling rate for CD (compact disc) audio is slightly higher, at 44.1 kHz. A brute force approach would be to represent all 4,000 inner hair cells as 4,000 filters. Equation 1 shows that there are five multiplication operations and four addition operations per filter per sample, for a total of nine operations per filter sample. Thus, a complete representation of a human ear would require 44,100*4,000*9=1,587,600,000 operations per second Such a large number of operations would make computation of the cochlear model impractical on all but the fastest computers. Digital signal processing chips typically have a multiply-accumulate instruction, and can perform one addition and multiplication as a single unit of computation. The number of computations required for a DSP to compute the formula of Equation 1 would drop to five, lowering the requirement to 882,000,000 operations per second. This is still impractical. Typically, the number of filters is reduced to a much more manageable size, on the order of 125 filters total, covering six octaves, with a sample rate of 16 kHz. Computation of this model requires 16,000*125*9=18,000,000 operations per second In a DSP, this would be 10,000,000 operations per second. The number of computations required is about two orders of magnitude smaller, but significant degradation of the sampled waveform has taken place. The frequency range has been reduced by four octaves, and the filter density within the range covered is lower, which reduces the resolution. Further, with the sampling frequency reduced to 16 kHz, the maximum frequency that can accurately be represented by the sampled waveform is now 8 kHz.

Increasing the number of filters to 600 and covering 10 octaves, as well as increasing the sampling frequency to 44.1 kHz results in significant improvement in resolution, and the frequency range covered now more closely approximates that of human hearing. This would require 44,100*600*9=238,140,000 operations per second or 132,300,000 operations per second in a DSP. This is better than the original number for a complete model, but is still very computationally expensive.

In accordance with the invention, the filters are evenly distributed over the octaves, resulting in 60 filters per octave. In one embodiment, 60 objects are created in a computer. Each object has a set of coefficients as described above, and additionally has ten sets of state variables, corresponding to ten filters running at frequencies that are whole octaves apart. The 60 objects using their first sets of state variables correspond to the first octave group of filters, while the 60 objects using their second sets of state variables (and sampling at a lower frequency) correspond to the second octave group of filters, and so on. In another embodiment, each object contains a set of coefficients, but only one set of state variables, and is run at a single frequency. In this case, 600 objects are required to represent 600 filters.

Figure 6:
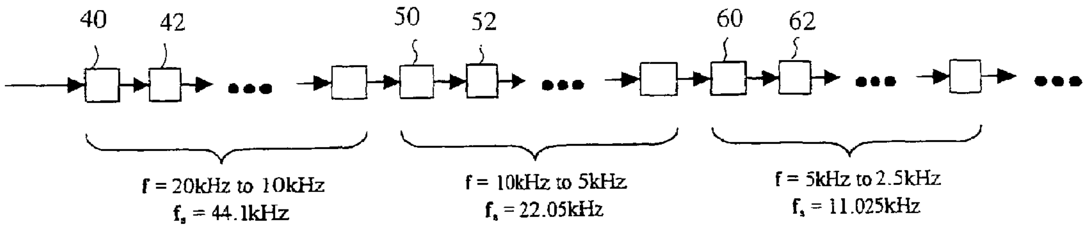
FIG. 6 is a schematic of the filter bank cascade showing its division into octaves and the use of downsampling.

The filters in the first octave are tuned to the frequencies in the highest octave, 20 kHz to 10 kHz, and are sampled at 44.1 kHz, which satisfies the Nyquist sampling criterion. The filters in the second octave are tuned to half of the frequencies of the corresponding filters in the first octave, and range from 10 kHz to 5 kHz. These filters in the second octave are sampled at 22.05 kHz, half of the first sampling frequency. Coefficients for each filter are stored in memory and applied in the computations for the filters. As the audio signal is passed through each filter, the signal is sampled and filtered before being passed to the next filter. FIG. 6 shows the arrangement of the filters. At the end of the first octave, the signal is passed into the first filter in the next octave, which comprises filters sampling at half the sampling rate of the first octave, as stated above. Successive octaves are downsampled in a similar manner. The computational requirement for the digital filter bank of the invention would be $$44{,}100*60*9*(1+\tfrac{1}{2}+\tfrac{1}{4}+\tfrac{1}{8}+\tfrac{1}{16}+\tfrac{1}{32}+\tfrac{1}{64}+\tfrac{1}{128}+\tfrac{1}{256}+\tfrac{1}{512})$$

47,581,488 operations per second, or 26,434,160 operations per second in a DSP. Thus, downsampling each successive octave has resulted in a fivefold reduction in computational requirements. This is a nontrivial improvement, particularly in the area of embedded signal processing chips, where performance, size, and cost are primary considerations.

For a given set of filter parameters ($a_0$, $a_1$, $a_2$, $b_1$, $b_2$) at a particular sampling rate $f_s$, the second-order filter will have some resonant frequency $f_r$. If the filter parameters are kept constant while the sampling rate $f_s$ is divided by two, the resonant frequency $f_r$ will also be divided by two, because the transfer function depends on z, which is a normalized frequency variable; i.e. it is normalized by the sampling rate $f_s$. Thus, scaling the sampling frequency scales the frequency response of the filter by the same amount. In this manner, the filter can be tuned to a frequency that is an octave lower, by sampling at half the original sampling rate without changing the filter coefficients. Downsampling again in this manner produces a filter that runs at yet another octave lower, so long as high frequencies are filtered out before downsampling. The sampling frequency does not necessarily have to be divided by two, four, or other multiples of two, nor do the filter frequencies have to be grouped by octaves. Any scaling factor may be used, such as ten (resulting in shifts by decades rather than octaves) or other number (resulting in shifts by a corresponding interval on a logarithmic scale), which does not have to be a whole number.

Thus, in the configuration depicted in FIG. 6, any given filter shares filter parameters with filters that are one, two, or more octaves higher or lower. For example, the highest frequency filter 40 in the first octave shares filter coefficients with the highest frequency filter 50 in the second octave, the highest frequency filter 60 in the third octave, and so on. The second-highest frequency filter 42 in the first octave shares filter coefficients with the second-highest frequency filters 52 and 62 in the second and third octaves, and with all other corresponding filters (tuned to frequencies that are one, two, or more octaves lower). It will be apparent that "corresponding" refers to filters that occupy the same relative positions in their respective octaves.

In effect, the filters 40, 50, 60, and other filters in corresponding positions in other octaves are the same filter. Similarly, filters 42, 52, 62, and corresponding filters are the same filter, as are all groups of filters that differ in frequency by whole octaves. A single filter can be used to sample a target frequency, and other target frequencies that are one, two, or more octaves lower, with reduction of the sampling frequency as described above, as long as the Nyquist criterion of removing higher frequencies is observed.

This reduces storage requirements for filter coefficients, because only one set of filter coefficients (for one octave) needs to be stored. Successive octaves may reuse the filter coefficients in accordance with the invention. Another advantage of the invention is that the required precision for filter coefficients is lower, and thus, fewer bits are required to represent each coefficient. In the prior art approach, 20 bits were required for acceptable results, particularly for the low-frequency filter coefficients. The inventive digital filter bank cascade requires about 12 bits to maintain an acceptable level of stability.

The advantage of reducing precision of the filter coefficients is not limited to storage. The reduced number of bits in the operands means that the processing hardware can be made smaller. For example, the arithmetic logic unit can be made smaller, since it does not need to process as many bits, and buses can be made narrower. Further advantages of reduced precision requirements will be readily apparent to one skilled in the art, as will other advantages of the invention.

The foregoing disclosure and embodiment demonstrate the utility of the present invention in dramatically increasing the efficiency of computing digital filter bank cascades for purposes such as audio signal processing, although it will be apparent that the present invention will be beneficial for many other uses.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. For example, one skilled in the art will recognize that the filters do not necessarily need to be evenly distributed over the octaves, or that the filters do not necessarily need to be used with an audio signal. The present embodiments are to be considered as illustrative and not restrictive, and the invention is not to be limited to the details given herein. It is therefore intended that the following claims be interpreted as covering all such alterations and modifications as fall within the true spirit and scope of the invention.

What is claimed is:

1. A system for processing audio signals, comprising:

a sequence of digital filters arranged in at least one filter group, wherein each filter group processes the audio signal for a particular frequency interval at a particular sampling rate, wherein each filter in the filter group is configured to process a selected frequency that is progressively lower than a prior filter of the filter group before passing the audio signal to a next filter in the filter group; and coefficients of each filter of the filter group configured for processing more than one frequency, wherein same coefficients are used for processing audio signals that are a factor of a frequency interval apart;

wherein each frequency is processed over 10 octaves and each octave is processed by a filter group having 60 filters.

2. The system as recited in claim 1, wherein at least one filter of the filter group is configured to process a first frequency and a second frequency that is a factor of at least one frequency interval away from the first frequency.

3. The system as recited in claim 1, wherein the frequency interval is an octave.

4. The system as recited in claim 2, wherein the at least one filter is configured to sample the first frequency at a first sampling rate and the second frequency at a second sampling rate.

5. The system as recited in claim 4, wherein the second frequency is lower than the first frequency and the second sampling rate is lower than the first sampling rate.

6. The system as recited in claim 4, wherein the second sampling rate is lower than the first sampling rate by two raised to a number of octaves spacing between the first frequency and the second frequency.

7. The system as recited in claim 1, wherein the at least one filter group is configured to process frequencies in a first octave at a first sampling rate.

8. The system as recited in claim 7, wherein the at least one filter group is further configured to process frequencies in a second octave at a second sampling rate.

9. The system as recited in claim 1, wherein each coefficient is represented by fewer than 13 bits.

10. The system as recited in claim 1, wherein each coefficient is represented by 12 bits.

11. A system for processing audio signals, comprising:

a sequence of digital filters arranged in at least one filter group, each filter group configured to process a selected frequency interval, wherein each filter in the filter group includes coefficients for processing an audio signal before passing the audio signal to a next filter in the filter group, and a first filter of a first filter group configured to process a first frequency shares its coefficients with a second filter in a corresponding position of a second filter group configured to process a second frequency that is spaced apart from the first frequency by a factor of a frequency interval;

wherein each frequency is processed over 10 octaves and each octave is processed by a filter group having 60 filters.

12. The system as recited in claim 11, wherein the second frequency is spaced apart from the first frequency by a factor of at least one octave.

13. The system as recited in claim 11, wherein the first filter is configured to sample the first frequency at a first sampling frequency and the second filter is configured to sample the second frequency at a second sampling frequency.

14. The system as recited in claim 13, wherein the second frequency is lower than the first frequency, and the second sampling frequency is lower than the first sampling frequency by a ratio of the first frequency to the second frequency.

15. The system as recited in claim 11, the first filter group operates in a first octave and the second filter group operates in a second octave.

16. The system as recited in claim 15, wherein the filters in the first octave are sampled at a first sampling frequency that is at least twice as high as a highest frequency processed by the first octave.

17. The system as recited in claim 16, wherein the second octave is one octave lower than the first octave, and the filters in the second octave are sampled at a second sampling rate that is half as high as the first sampling frequency.

18. The system as recited in claim 15, wherein each filter in the first octave shares its coefficient with each filter in a corresponding position in the second octave.

19. A computer program product comprising a computer usable medium having machine readable code embodied therein for performing a method for processing an audio signal, the method comprising:

(a) providing a sequence of digital filters arranged in at least one filter group each filter group configured to process the audio signal for a particular frequency interval at a particular sampling rate;

(b) providing each filter with coefficients for processing its selected frequency such that a first filter of a first filter group configured to process a first frequency shares its coefficients with a second filter in a corresponding position of a second filter group configured to process a second frequency that is a factor of the frequency interval lower than the first frequency; and (c) applying the audio signal to the sequence of digital filters, wherein each frequency is processed over 10 octaves and each octave is processed by a filter group having 60 filters.

20. The system as recited in claim 1, wherein the audio signal is passed to a next filter group until processing is completed.

21. The system as recited in claim 11, wherein the first filter group and the second filter group are a same filter group.

22. The system as recited in claim 19, wherein the first filter group and the second filter group are a same filter group.

* * * * *